US012297019B2

(12) United States Patent
Liu

(10) Patent No.: US 12,297,019 B2
(45) Date of Patent: May 13, 2025

(54) BOTTLE CAP WITH INDEPENDENT STOCK BIN

(71) Applicant: DaXingAnLing Perfection Nobility Frigid Zone Bio-Technology Co., Ltd., Daxinganling (CN)

(72) Inventor: Wei Liu, Daxinganling (CN)

(*) Notice: Subject to any disclaimer, the term of this patent is extended or adjusted under 35 U.S.C. 154(b) by 32 days.

(21) Appl. No.: 18/211,294

(22) Filed: Jun. 19, 2023

(65) Prior Publication Data

US 2024/0391665 A1  Nov. 28, 2024

(30) Foreign Application Priority Data

May 25, 2023 (CN) .......................... 202310597955.9

(51) Int. Cl.
*B65D 51/28* (2006.01)
*B65D 81/32* (2006.01)

(52) U.S. Cl.
CPC ......... *B65D 51/2807* (2013.01); *B65D 81/32* (2013.01)

(58) Field of Classification Search
CPC .... B65D 51/2807; B65D 81/32; B65D 83/00; B65D 51/2821
USPC ................................................ 206/219–221
See application file for complete search history.

(56) References Cited

U.S. PATENT DOCUMENTS

| | | | | |
|---|---|---|---|---|
| 4,638,927 A | * | 1/1987 | Morane | B65D 51/2821 604/91 |
| 5,255,812 A | * | 10/1993 | Hsu | F24V 30/00 126/263.01 |
| 6,098,795 A | * | 8/2000 | Mollstam | C12N 1/20 206/219 |
| 6,105,760 A | * | 8/2000 | Mollstam | B65D 81/3222 206/219 |
| 6,786,330 B2 | * | 9/2004 | Mollstam | B65D 81/3222 206/219 |
| 8,714,808 B2 | * | 5/2014 | Yamanaka | B65D 51/2821 366/130 |
| 8,770,399 B2 | * | 7/2014 | Hjalmarsson | B65D 51/2821 206/219 |
| 9,193,517 B2 | * | 11/2015 | Fontana | B65D 83/00 |
| 11,279,528 B2 | * | 3/2022 | Davies | B65D 47/121 |
| 2012/0067901 A1 | * | 3/2012 | Hjalmarsson | B65D 51/2821 220/501 |
| 2012/0285985 A1 | * | 11/2012 | Jones | B67B 3/20 206/219 |
| 2013/0292275 A1 | * | 11/2013 | Smart | B65D 51/2835 220/521 |

* cited by examiner

*Primary Examiner* — Chun Hoi Cheung

(57) ABSTRACT

A bottle cap with an independent stock bin includes a mouth connecting cap and a pressing cap, where an upper end of the mouth connecting cap is fixedly connected to a connecting cylinder cooperated with the pressing cap; a blister stock bin is provided in the connecting cylinder, a content is provided in the blister stock bin; an open end of the blister stock bin is fixedly connected to a limiting retainer ring; the limiting retainer ring is fixedly connected to a sealing aluminum foil; and an inner top of the pressing cap is fixedly connected to a pressing bump cooperated with the blister stock bin.

5 Claims, 3 Drawing Sheets

BOTTLE CAP WITH INDEPENDENT STOCK BIN

CROSS REFERENCE TO THE RELATED APPLICATIONS

This application is based upon and claims priority to Chinese Patent Application No. 202310597955.9, filed on May 25, 2023, the entire contents of which are incorporated herein by reference.

TECHNICAL FIELD

The present disclosure relates to the technical field of bottle caps, and in particular to a bottle cap with an independent stock bin.

BACKGROUND

With the continuous development of science and technology, various beverages have gradually come into people's life. However, existing beverages are all mixed with water and bottled for storage. After the water is mixed, the shelf life of the beverage is shortened greatly. In order to prolong the shelf life, an agent and a liquid for some beverages are packaged separately in production. However, separate packaging creates an inconvenience for the user and may lead to a loss of the separated packaging.

SUMMARY

A technical problem to be solved by the present disclosure is to provide a bottle cap with an independent stock bin, to overcome the above defects. The present disclosure is used more conveniently, because a liquid and an agent are stored integrally, and the agent can be added instantly.

To solve the above technical problem, the present disclosure provides the following technical solutions: A bottle cap with an independent stock bin includes a mouth connecting cap and a pressing cap, where an upper end of the mouth connecting cap is fixedly connected to a connecting cylinder cooperated with the pressing cap; a blister stock bin is provided in the connecting cylinder; a content is provided in the blister stock bin; an open end of the blister stock bin is fixedly connected to a limiting retainer ring; the limiting retainer ring is fixedly connected to a sealing aluminum foil; and an inner top of the pressing cap is fixedly connected to a pressing bump cooperated with the blister stock bin.

As an improvement, a protective retainer ring cooperated with the limiting retainer ring is slidably connected in the mouth connecting cap.

As an improvement, the blister stock bin is made of a plastic material.

As an improvement, a fixing strip is fixedly connected between the mouth connecting cap and the pressing cap; and a point-like connecting member is fixedly connected between an upper end surface of the fixing strip and the pressing cap as well as between a lower end surface of the fixing strip and the mouth connecting cap.

As an improvement, one end of the fixing strip is fixedly connected to an L-shaped bump.

As an improvement, an inner diameter of the mouth connecting cap is greater than an inner diameter of the connecting cylinder, and a diameter of the limiting retainer ring is greater than the inner diameter of the connecting cylinder.

The present disclosure has the following advantages over the prior art: The agent of a beverage can be stored by the blister stock bin. The blister stock bin provided with the agent of the beverage is integrally connected to a beverage bottle through the bottle cap. When the agent of the beverage is to be mixed, the content in the blister stock bin is squeezed out through the pressing cap and the pressing member.

In the figures: 1: mouth connecting cap, 2: pressing cap, 3: connecting cylinder, 4: blister stock bin, 5: limiting retainer ring, 6: protective retainer ring, 7: fixing strip, 8: point-like connecting member, 9: L-shaped bump, 10: pressing bump, and 11: sealing aluminum foil.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative efforts should fall within the protection scope of the present disclosure.

Figure 1:
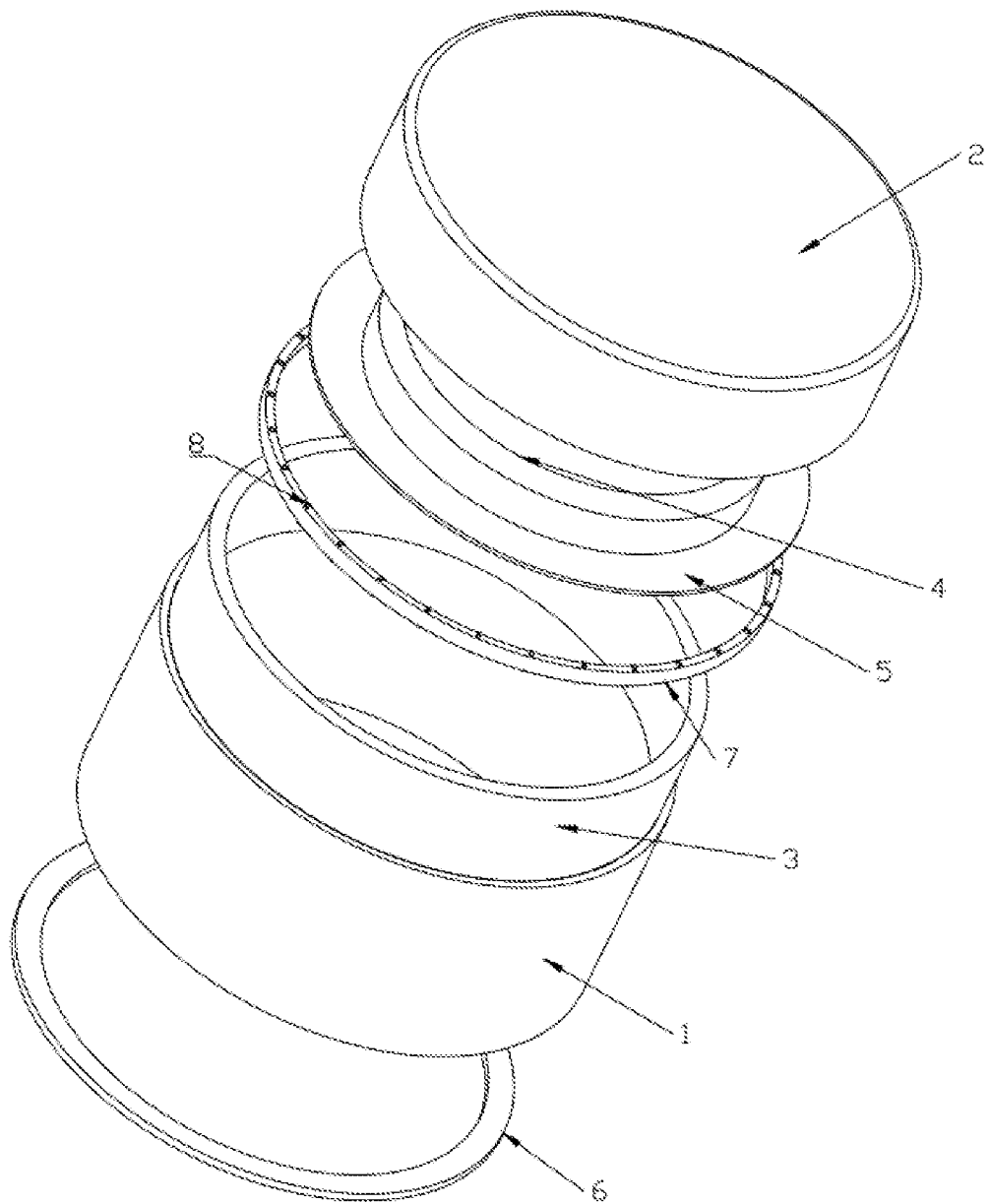
FIG. 1 is an exploded view of a bottle cap with an independent stock bin according to the present disclosure.
Figure 2:
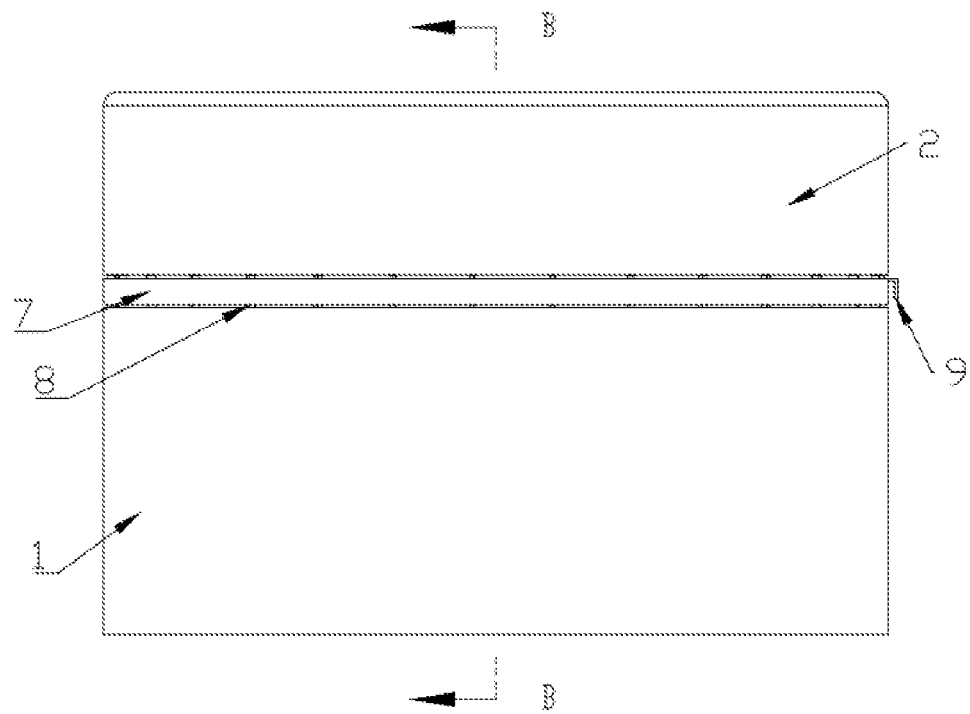
FIG. 2 is a front view of a bottle cap with an independent stock bin according to the present disclosure.
Figure 3:
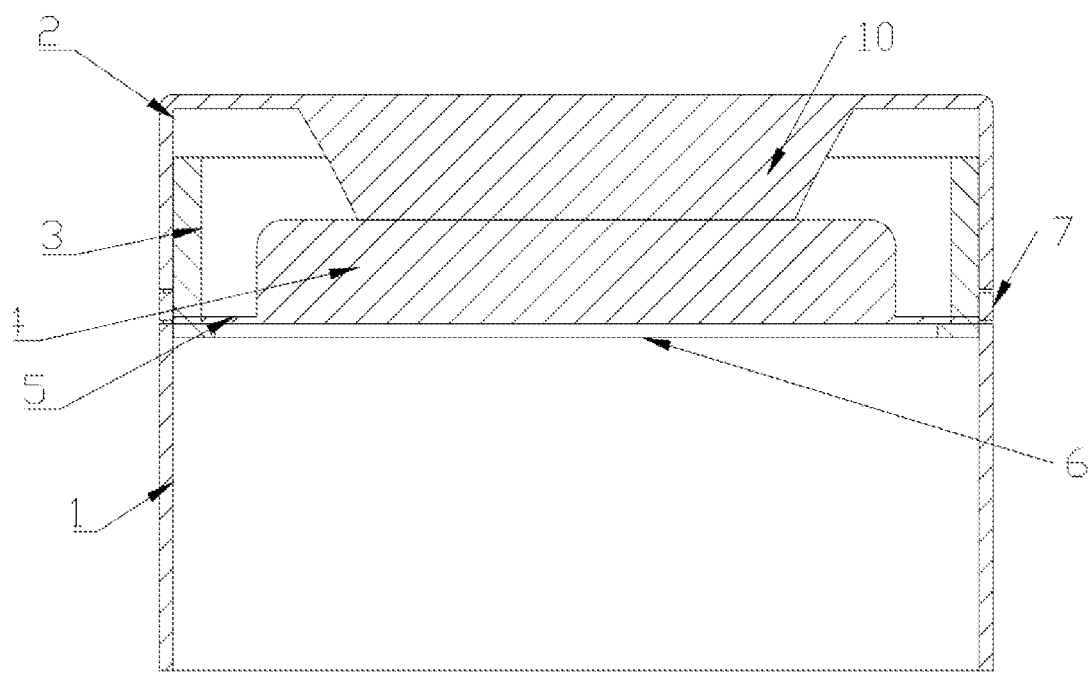
FIG. 3 is a sectional view at a position B-B of a bottle cap with an independent stock bin according to the present disclosure.
Figure 4:
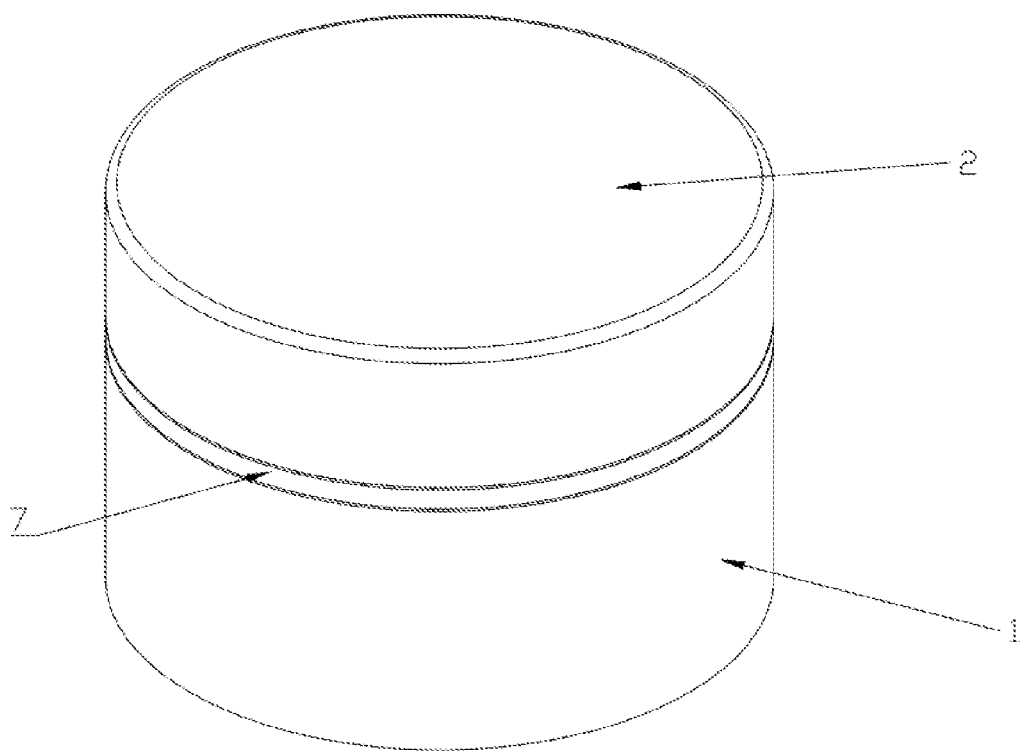
FIG. 4 is a perspective view of a bottle cap with an independent stock bin according to the present disclosure.
Figure 5:
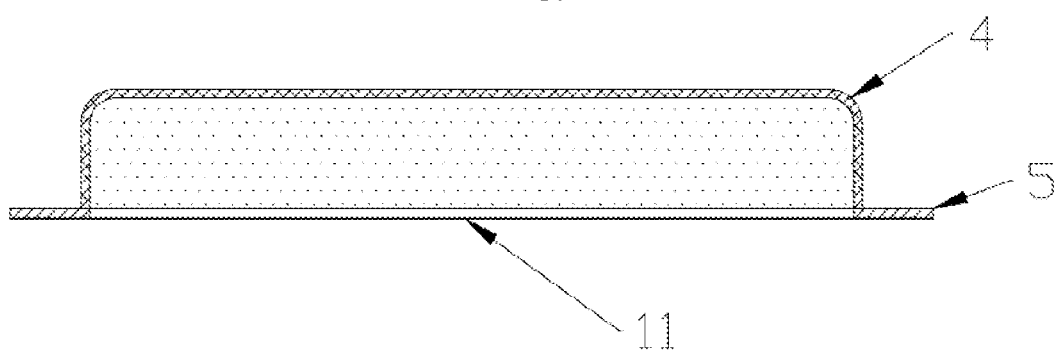
FIG. 5 is a sectional view of a blister stock bin in a bottle cap with an independent stock bin according to the present disclosure.

As shown in FIG. 1 to FIG. 5, a bottle cap with an independent stock bin includes mouth connecting cap 1 and pressing cap 2. An upper end of the mouth connecting cap 1 is fixedly connected to connecting cylinder 3 cooperated with the pressing cap 2. An inner diameter of the mouth connecting cap 1 is greater than an inner diameter of the connecting cylinder 3. Blister stock bin 4 is provided in the connecting cylinder 3. The blister stock bin 4 is made of a plastic material. A content is provided in the blister stock bin 4. An open end of the blister stock bin 4 is fixedly connected to limiting retainer ring 5. The limiting retainer ring 5 is fixedly connected to sealing aluminum foil 11. The sealing aluminum foil 11 and the limiting retainer ring 5 are connected by hot pressing. A diameter of the limiting retainer ring 5 is greater than the inner diameter of the connecting cylinder 3. An inner top of the pressing cap 2 is fixedly connected to pressing bump 10 cooperated with the blister stock bin 4. Protective retainer ring 6 cooperated with the limiting retainer ring 5 is slidably connected in the mouth connecting cap 1. Fixing strip 7 is fixedly connected between the mouth connecting cap 1 and the pressing cap 2. A point-like connecting member 8 is fixedly connected between an upper end surface of the fixing strip 7 and the pressing cap 2 as well as between a lower end surface of the fixing strip 7 and the mouth connecting cap 1. One end of the fixing strip 7 is fixedly connected to L-shaped bump 9.

In specific use, the mouth connecting cap 1 is connected to a beverage bottle. Common threaded connection in a market is used between the mouth connecting cap 1 and the beverage bottle. A mouth of the beverage bottle pushes the protective retainer ring 6 to slide upward, such that the limiting retainer ring 5 is clamped between the protective retainer ring 6 and a lower end of the connecting cylinder 3. When the content in the blister stick bin 4 is to be added to the beverage bottle, the L-shaped bump 9 is pulled to tear off the fixing strip 7. The pressing cap 2 is flapped downward vigorously, such that an inner wall of the pressing cap 2 slides downward along an outer wall of the connecting cylinder 3. Meanwhile, the pressing cap 2 drives the pressing bump 10 to slide downward to contact the blister stock bin 4. Consequently, the blister stock bin 4 is compressed, a pressure in the blister stock bin 4 is increased, and the sealing aluminum foil 11 is damaged. Therefore, the content in the blister stock bin 4 flows to the beverage bottle, thereby mixing with a liquid.

It should be noted that relational terms herein such as first and second are merely used to distinguish one entity or operation from another entity or operation without necessarily requiring or implying any actual such relationship or order between such entities or operations. In addition, terms "include", "comprise", or any other variations thereof are intended to cover a non-exclusive inclusion, so that a process, a method, an article, or a device including a series of elements not only includes those elements, but also includes other elements that are not explicitly listed, or also includes inherent elements of the process, the method, the article, or the device.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

The present disclosure and the embodiments thereof are described as above, and the description is not limiting; and what is shown in the drawing is only one of the embodiments of the present disclosure, and the actual structure is not limited thereto. All in all, if a person of ordinary skill in the art is inspired by the present disclosure, and designs, without departing from the purpose of the present disclosure, structural modes and embodiments similar to the technical solutions without inventive step, they shall fall within the scope of protection of the present disclosure.

What is claimed is:

1. A bottle cap with an independent stock bin, comprising a mouth connecting cap and a pressing cap, wherein an upper end of the mouth connecting cap is fixedly connected to a connecting cylinder, wherein the connecting cylinder is cooperated with the pressing cap;
    a blister stock bin is provided in the connecting cylinder;
    a content is provided in the blister stock bin;
    an open end of the blister stock bin is fixedly connected to a limiting retainer ring;
    the limiting retainer ring is fixedly connected to a sealing aluminum foil; and
    an inner top of the pressing cap is fixedly connected to a pressing bump, wherein the pressing bump is cooperated with the blister stock bin;
    wherein a fixing strip is fixedly connected between the mouth connecting cap and the pressing cap; and a point-like connecting member is fixedly connected between an upper end surface of the fixing strip and the pressing cap as well as between a lower end surface of the fixing strip and the mouth connecting cap.

2. The bottle cap according to claim 1, wherein a protective retainer ring is slidably connected in the mouth connecting cap, wherein the protective retainer ring is cooperated with the limiting retainer ring.

3. The bottle cap according to claim 1, wherein the blister stock bin is made of a plastic material.

4. The bottle cap according to claim 1, wherein one end of the fixing strip is fixedly connected to an L-shaped bump.

5. The bottle cap according to claim 1, wherein an inner diameter of the mouth connecting cap is greater than an inner diameter of the connecting cylinder, and a diameter of the limiting retainer ring is greater than the inner diameter of the connecting cylinder.

* * * * *